(12) United States Patent
Kumar et al.

(10) Patent No.: US 6,958,855 B2
(45) Date of Patent: Oct. 25, 2005

(54) MICROSTRUCTURE FIBER OPTICAL PARAMETRIC OSCILLATOR

(75) Inventors: Prem Kumar, Skokie, IL (US); Jay E. Sharping, Evanston, IL (US)

(73) Assignee: Northwestern University, Evanston, IL (US)

( * ) Notice: Subject to any disclaimer, the term of this patent is extended or adjusted under 35 U.S.C. 154(b) by 183 days.

(21) Appl. No.: 10/672,649

(22) Filed: Sep. 26, 2003

(65) Prior Publication Data

US 2004/0125434 A1 Jul. 1, 2004

Related U.S. Application Data

(60) Provisional application No. 60/414,431, filed on Sep. 27, 2002.

(51) Int. Cl.[7] ............................. G02F 1/39; G02F 1/365
(52) U.S. Cl. ........................................ 359/330; 359/332
(58) Field of Search ................................. 359/326–332

(56) References Cited

U.S. PATENT DOCUMENTS 6,757,096 B2 * 6/2004 Schiller ...................... 359/330
6,801,356 B2 * 10/2004 Broderick et al. ........... 359/332
6,897,434 B1 * 5/2005 Kumar et al. ........... 250/227.18

* cited by examiner

*Primary Examiner*—John D. Lee
(74) *Attorney, Agent, or Firm*—McAndrews, Held & Malloy, Ltd.

(57) ABSTRACT

A fiber optical parametric oscillator is formed using photonic crystal fibers, also known as microstructure fibers or holey fibers. The optical parametric oscillator includes only a few meters of microstructure fiber. In one embodiment, the microstructure fiber is disposed between a highly reflective mirror and a diffraction grating in a simple Fabry-Perot configuration wherein the diffraction grating is tuned to reflect a particular wavelength of the signal wave back to the microstructure fiber. In another embodiment, the microstructure fiber is disposed in a ring cavity and the parametric oscillator is synchronously pumped. The parametric oscillator may be implemented with free space optics or use all fiber optic components.

63 Claims, 4 Drawing Sheets

MICROSTRUCTURE FIBER OPTICAL PARAMETRIC OSCILLATOR

CROSS-REFERENCE TO RELATED APPLICATIONS

This application is a continuation-in-part of U.S. Provisional Application Ser. No. 60/414,431 filed Sep. 27, 2002.

REGARDING FEDERALLY SPONSORED RESEARCH OR DEVELOPMENT

This work was supported in part by the U.S. Army Research Office under a collaborative MURI grant (DAAD19-00-1-0177) and the associated MURI Fellowship (DAAD19-00-1-0469) as well as by the National Science Foundation under Grants ANI-0123495, ECS-0000241 and the IGERT DGE-9987577.

FIELD OF THE INVENTION

The present invention relates to an optical parametric oscillator and more particularly to an optical parametric oscillator utilizing photonic crystal fibers, also known as holey fibers or microstructure fibers.

BACKGROUND OF THE INVENTION

Many applications, particularly in the field of wavelength-division-multiplexing (WDM) communication systems, require wavelength-tunable optical pulse sources with multigigahertz repetition rate.

Fiber optical parametric oscillators in the form of a modulational instability laser are known in which all of the pump, signal and idler waves are resonated inside a fiber ring cavity. The operation of this system, however, is undesirably phase sensitive because all three of the waves are resonant. Known fiber optical parametric oscillators have oscillated at the point of modulational instability where the gain of the signal is at a maximum. However, the oscillation frequency can be shifted by only a small amount by changing the pump power. They are therefore, not tunable to a desired frequency over the gain bandwidth.

Another known fiber parametric oscillator is disclosed in U.S. patent application Ser. No. 09/431,550 entitled "Tunable Fiber Optic Parametric Oscillator" filed Oct. 29, 1999. This fiber optic parametric oscillator includes a fiber parametric amplifier in the form of a nonlinear fiber Sagnac interferometer or a nonlinear optical loop mirror having a pump wave port and a signal wave port with a dispersion shifted fiber portion therebetween for amplifying a signal wave having a signal pulse coincident with a pump wave pulse and simultaneously generating an idler wave. The pump wave is reflected back to the pump wave port whereas the signal and idler waves pass through the signal port and are directed to a spectral filter in the form of a diffraction grating. The spectral filter is tunable to reflect a signal wave of a particular wavelength back to the fiber parametric amplifier so as to provide nondegenerate operation of a synchronously pumped fiber optic parametric oscillator. However, this parametric oscillator needs a powerful source and extremely long lengths of fiber.

Microstructure fibers having a high nonlinearity per unit length and low susceptibility to bending loss are known. Optical generation schemes based on nonlinear parametric effects in fibers are beneficial for this purpose for two reasons: 1) the wavelength tunability of the oscillating signal is not limited by the erbium-doped fiber amplifier (EDFA) gain band and 2) the fundamental limit on the repetition rate is the time response of the fiber's Kerr nonlinearity, which is in the femtosecond range. A simple means of implementing such a source relies on pulsed supercontinuum generation (SCG) in the fiber followed by spectral slicing. This scheme, however, suffers from reduction of the power spectral density as the wavelength detuning between the desired signal and the pump is increased. Furthermore, it has been shown that the coherence of the generated supercontinuum is limited; it leads to progressive degradation of the spectral modulation depth of the signal pulses as one moves away from the pump wavelength.

BRIEF SUMMARY OF THE INVENTION

In accordance with the present invention, the disadvantages of prior fiber optic parametric oscillators have been overcome. The fiber optical parametric oscillator of the present invention utilizes photonic crystal fibers, also known as holey fibers or microstructure fibers to perform all optical processing functions. By taking advantage of the properties of these types of fibers hereinafter referred to as microstructure fibers, the parametric oscillator of the present invention operates up to thirty times more efficiently than prior devices. The optical parametric oscillator of the present invention requires only a small amount of fiber, and the reduction in bending loss will allow the system to be packaged into a small volume. Further, the ellipticity of the fiber's polarization modes allows the device to be implemented in a relatively simple Fabry-Perot configuration.

More particularly, a fiber optical parametric oscillator in accordance with one embodiment of the present invention includes a microstructure fiber having a first end and a second end and a pump wave input to the first end of the microstructure fiber. A movable reflective mirror reflects a wave from the second end of the microstructure fiber back to the microstructure fiber. A diffraction grating is tuned to reflect a signal wave of a particular wavelength. A beam splitter is disposed between the first end of the microstructure fiber and the diffraction grating. The beam splitter passes the pump wave to the first end of the microstructure fiber, the wave being reflected by the reflective mirror back through the microstructure fiber, the microstructure fiber generating a signal wave and an idler wave that are directed from the first end of the microstructure fiber to the diffraction grating by the beam splitter. The diffraction grating reflects a signal wave of a particular wavelength back to the beam splitter and from the beam splitter back to the microstructure fiber. The beam splitter also passes a portion of the signal wave to an output of the parametric oscillator.

In one embodiment of the present invention, the pump wave has a wavelength that is near the zero-dispersion wavelength of the microstructure fiber.

In another embodiment of the fiber optical parametric oscillator of the present invention includes a pump wave that passes through a polarization beam splitter to a half-wave plate to produce a wave that is optimally horizontally and vertically polarized for input to a microstructure fiber. The pump wave passes through the microstructure fiber to a mirror which reflects the wave back through the microstructure fiber and half-wave plate to the polarization beam splitter. The polarization beam splitter directs a small portion of the pump wave through a quarter-wave plate to a spectral filter, with the bulk of the pump wave transmitting the polarization beam splitter back towards the input. The spectral filter, which takes the form of a diffraction grating, is tuned to reflect a signal wave of a particular wavelength back to the microstructure fiber. The path from the mirror through the microstructure fiber to the grating forms a cavity wherein the pump wave in the microstructure fiber produces a signal wave and an idler wave where the signal wave is built up by being reflected back into the cavity by the tuned diffraction grating and then reflected back to the grating by the mirror.

In a further embodiment of the present invention, the fiber optical parametric oscillator includes a fiber optical ring cavity, at least a portion of which is formed of a microstructure fiber. A pump wave is coupled to an input of the ring cavity from a mode-locked laser to provide synchronously pumped parametric oscillation in the cavity. The fiber optical parametric oscillator has a high repetition rate and is tunable over a wide range in the 1550 nm telecommunications band.

In one embodiment of the ring configuration of the fiber optical parametric oscillator, the oscillator is synchronously mode-locked at a cavity fundamental frequency that is the same as the fundamental rate of the pump wave. In another embodiment, the fundamental frequency of the oscillator cavity is a subharmonic of the output pulse repetition rate. In still another embodiment, the fundamental frequency of the oscillator cavity is a high harmonic of the output pulse repetition rate.

The microstructure fiber of the present invention may have polarization modes that are elliptical or non-elliptical. Further, the microstructure fiber may have a positive dispersion slope or a negative dispersion slope.

These and other advantages and novel features of the present invention, as well as details of an illustrated embodiment thereof, will be more fully understood from the following description and drawings.

DETAILED DESCRIPTION OF THE INVENTION

Figure 1:
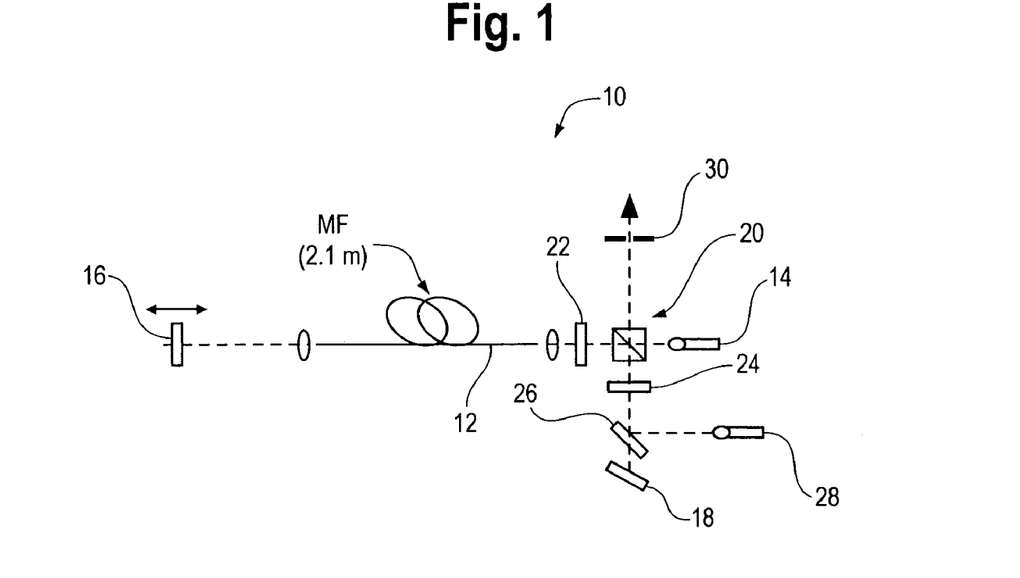
FIG. 1 is a block diagram of one embodiment of a fiber optical parametric oscillator of the present invention.

An optical parametric oscillator 10 in accordance with one embodiment of the present invention, as shown in FIG. 1 utilizes a microstructure fiber 12 also known as a photonic crystal fiber or a holey fiber. The ellipticity of the microstructure fibers polarization modes allows the optical parametric oscillator 10 to be implemented in a relatively simple Fabry-Perot configuration. Moreover, spectral peaks due to cascaded-mixing processes may extend the tunability range of existing high-power lasers.

One aspect of the present invention is to provide a tunable source in the blue-green region of the spectrum. Heretofore, optical parametric oscillators based on $x^2$ nonlinearities have been used to build tunable sources. However, generating radiation in the blue-green portion of the spectrum requires multiple nonlinear interactions such as second harmonic generation in conjunction with parametric downconversion. Moreover, these optical parametric oscillators require hundreds of meters of fiber and are restricted to operating at wavelengths in the range of 1300–1600 nm. Microstructure fibers have been fabricated with zero dispersion wavelengths ranging from 550 to 1550 nm. In accordance with one embodiment of the present invention, using a microstructure fiber whose zero dispersion wavelength $\lambda_0$ is close to the wavelength of a high power laser source, a microstructure fiber optic parametric oscillator is provided that is tunable about that wavelength. The tunable range depends on the slope of the group-velocity dispersion near $\lambda_0$ so that by varying the group-velocity dispersion slope a more broadly tunable source can be constructed.

The present invention takes advantage of a combination of three particular properties of microstructure fibers that permits them to operate up to thirty times more efficiently than prior optical fibers. More particularly, microstructure fibers combine high nonlinearity with greater flexibility in design of dispersion properties and polarization maintaining behavior. As a result of this improvement in efficiency, the optical parametric oscillator 10 can operate using much less optical power and much smaller amounts of fiber than prior optical parametric oscillators. Further, microstructure fibers exhibit a strong guiding behavior, thus allowing the fiber to be coiled relatively tightly without introducing loss. The increase in efficiency combined with the ability to use the fiber in a small package makes the technology much more commercially viable than other fiber-based nonlinear optical devices.

The optical parametric oscillator 10 of the present invention operates on the basis of four-wave mixing in a microstructure fiber. More particularly, the gain in the optical parametric oscillator 10 results from phase-matched four-wave mixing in the microstructure fiber 12. The measured wavelength tunability range of the optical parametric oscillator is 40 nm and threshold pump peak power is 34.4 W. By pumping the optical parametric oscillator 10 near the zero-dispersion wavelength of the microstructure fiber 12, tunable radiation at wavelengths shorter than that of the pump are obtained. Cascaded four-wave mixing is also observed, wherein the pump wave, and the generated oscillating signal and idler wave mix to create radiation at new wavelengths. By pumping the microstructure fiber with Ti:sapphire or other high power laser sources, tunable light at other visible or infrared wavelengths may also be generated.

Four-wave mixing in microstructure fibers can be phase matched by choosing the wavelengths to lie close to the fiber's zero-dispersion wavelength, $\lambda_0$. For a given pump angular frequency, $\omega_p$, and the nonlinear refractive index of glass, $\eta_2=2.8\times10^{-20}$ m$^2$/W, the nonlinear coefficient, $\gamma=\eta_2\omega_p/A_{\it eff}c$, is enhanced by using microstructure fibers which have a very small effective mode area, $A_{\it eff}$. Under the assumptions of a strong pump and negligible group-velocity mismatch, the phase-matching condition for four-wave mixing can be written as $$\kappa \cong 2\gamma P_p + \beta_2(\omega_s-\omega_p)^2=0,$$

where $\beta_2$ is the group-velocity dispersion (GVD) coefficient and $\omega_s$ is the angular frequency of the signal. The dispersion parameter, $D= -\omega_p^2/2\pi c\beta_2$, may be used instead of $\beta_2$. When a strong pump wave interacts with a weak signal wave under the phase-matching conditions, the signal beam becomes amplified and an idler wave is generated with an angular frequency $\omega_i$ according to $\omega_i=2\omega_p-\omega_s$. The primary factors influencing the four-wave mixing gain are the nonlinear coefficient $\gamma$, the pump power, the fiber length, and the GVD coefficient $\beta_2$. By operating near the $\lambda_0$ of a fiber, one can achieve a small but negative $\beta_2$ which, in addition to causing a small amount of self-phase modulation on the pump, results in $\kappa \cong 0$ as required by the above equation. Use of this parametric-gain mechanism in conjunction with efficient wavelength-selective feedback results in a tunable optical parametric oscillator.

Figure 2:
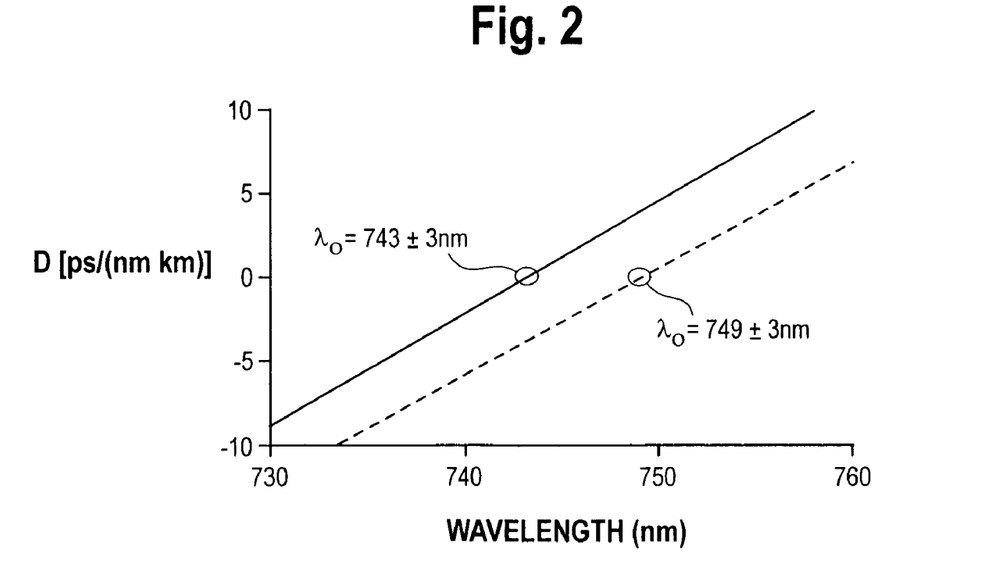
FIG. 2 is a graph illustrating the measured wavelength dependence of the GVD co-efficient, D, in the vicinity of $\lambda_0$ for the two polarization modes of one type of microstructure fiber.

The 2.1 m long microstructure fiber 12 used in the optical parametric oscillator 10 consists of a ~2.1 $\mu$m-diameter silica core surrounded by a hexagonal array of ~1.4 $\mu$m-diameter air voids. The attenuation coefficient, $\alpha$, is 0.02 m$^{-1}$ (86 dB/km) as measured by comparing the insertion losses for two different microstructure fiber lengths. This fiber exhibits strong birefringence. As shown in FIG. 2, the $\lambda_0$ turns out to be slightly different for the two polarization modes of this fiber.

The birefringence behavior of a microstructure fiber is made complicated by the presence of microbends and slight twists in the fiber. It is highly likely that the polarization eigenmodes are elliptically rather than linearly polarized, and that there may also be wavelength dependence in their ellipticity, a phenomenon known as second-order polarization-mode dispersion (PMD) in the context of telecommunication fibers. The presence of elliptical eigenmodes and second-order PMD are verified by observing changes in the polarization state after a single pass through the microstructure fiber 12 as the input polarization state and the wavelength are varied. Typically, injection of linearly-polarized light into the microstructure fiber results in a maximum of about 86% of the power in the fiber being coupled into the desired eigenmode with the remaining 14% leaking into the other. The presence of second-order PMD is verified by changing the wavelength of the input light and observing that the input polarization direction must also be slightly adjusted to return to the optimum setting.

As shown in FIG. 1, a pump wave, input at 14 to the optical parametric oscillator 10, is derived from a Ti:sapphire laser (Coherent, Inc., Model Mira 900). The pump wave consists of a 75 MHz train of approximately Gaussian-shaped pulses with a temporal width of 630±10 fs FWHM and a spectral width of 1.9±0.1 nm giving a time-bandwidth product of 0.64±0.03. The wavelength of the pump may be widely tunable from about 0.7 $\mu$m up to about 1 $\mu$m. The microstructure fiber 12 is placed within a Fabry-Perot (FP) cavity having a movable highly reflective mirror 16 on one end and a diffraction grating 18 in the Littrow configuration on the other end. The use of 2.1 m of microstructure fiber results in a microstructure fiber optical parametric oscillator cavity whose longitudinal mode spacing is exactly half that of the pump source. Thus, the system operates as a synchronously-pumped harmonically-mode-locked oscillator with output at the same 75 MHz repetition rate as that of the pump laser. The pump wave passes through a polarization beam splitter 20 that allows a strong pump beam to be injected, while the signal beam oscillates between the mirror 16 and the diffraction grating 18. A zero-order half-wave plate 22 is used in the cavity to vary the polarization of the input pump beam with respect to the polarization-mode axes of the microstructure fiber 12. More particularly, the half-wave plate 22 passes a wave that is equally horizontally and vertically polarized. A quarter-wave plate 24 is placed in between the polarization beam splitter 20 and the diffraction grating 18 to provide for a variable output coupling. The quarter-wave plate 24 allows a portion of the generated signal reflected by the grating 18 to pass through the polarization beam splitter 20 to a pin hole aperture or iris 30. A portion of the signal generated by the optical parametric oscillator 10 is then output via the pin hole aperture 30. A slide 26 is disposed between the quarter-wave plate 24 and the diffraction grating 18 to reflect light to a cavity monitor at 28 for diagnostic purposes.

In operation, the equally horizontally and vertically polarized pump wave passed by the half-wave plate 22 is directed through the microstructure fiber 12 to the mirror 16 which reflects the wave back through the microstructure fiber 12. The pump wave in the microstructure fiber generates signal and idler waves which are directed to the diffraction grating 18 by the polarization beam splitter 20. The diffraction grating 18 is tuned to reflect a signal wave of a particular wavelength back to the microstructure fiber 12 wherein the signal wave is built up in the cavity formed by the mirror 16, microstructure fiber 12 and diffraction grating 18.

Figure 3:
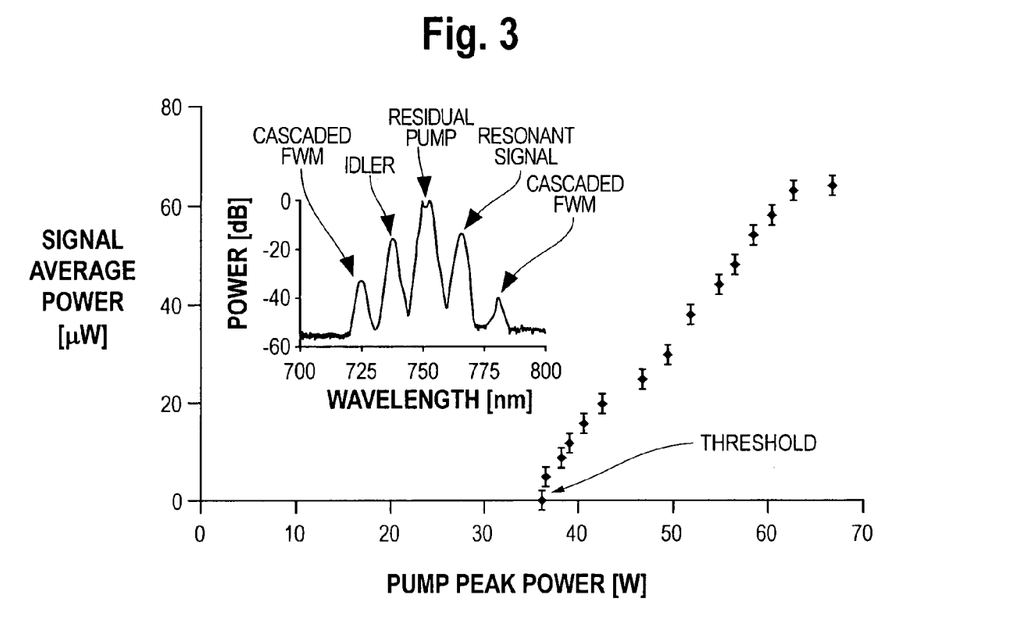
FIG. 3 is a plot of the signal output average power versus the pump peak power with an inset graph depicting a typical intracavity spectrum showing the peaks at the pump, the oscillating signal, the generated idler and the cascaded mixing wavelengths.
Figure 4:
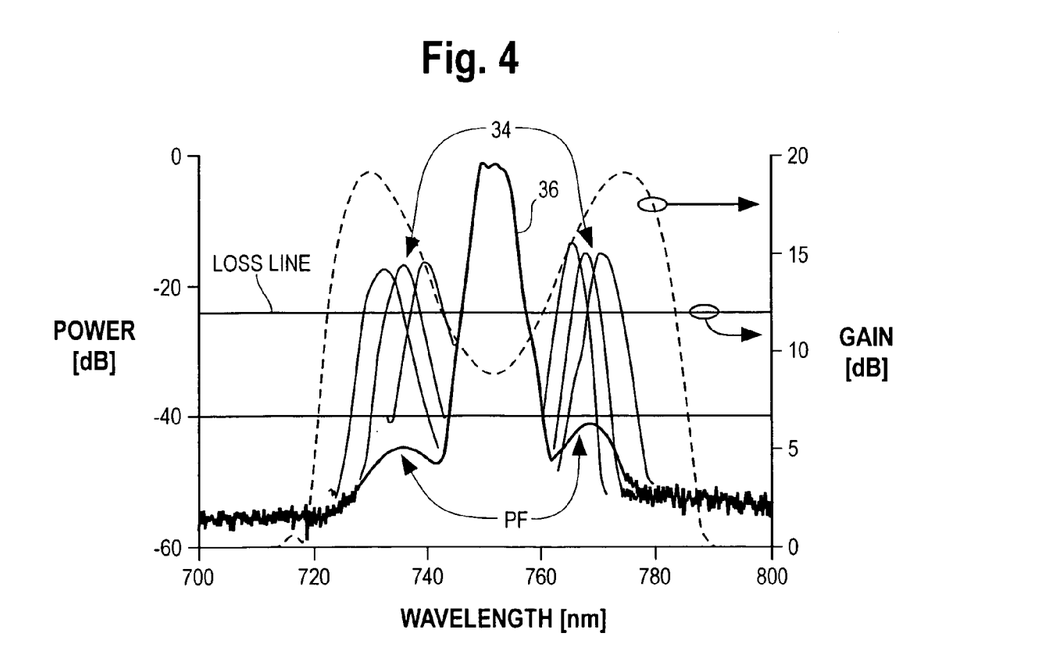
FIG. 4 is a graph illustrating a composite of the output spectra.

FIG. 3 shows the power recorded at the signal output port vs. the pump power coupled into the microstructure fiber 12. The oscillation threshold behavior is clearly seen when the pump peak power exceeds 34.4 W (1.67 mW average power). The inset in FIG. 3 shows a typical optical spectrum measured at the cavity-monitor port for a pump wavelength of 751.8 nm. One observes peaks due to the residual pump, the oscillating signal (with the cavity length tuned for oscillation at 765.9 nm), and the generated idler at 737.9 nm. Cascaded four-wave mixing is also observed, which leads to the peaks at 725 nm and 780 nm. The small dip in the center of the pump peak gives clear evidence of the self-phase modulation of the pump. FIG. 4 shows a composite of the output spectra recorded at the cavity-monitor port for various settings of the grating and the high reflector, revealing the tunability of the microstructure fiber optical parametric oscillator. The peaks 34 to the right and left of the pump peak at 751.8 nm represent different oscillating signal wavelengths. The signal output may be tuned over a 40 nm range by simply rotating the diffraction grating and moving the end mirror to compensate for the GVD-induced cavity-length change. We also observe spontaneous parametric fluorescence, labeled PF in FIG. 4, in the wings of the central pump peak 36, which was obtained by blocking the microstructure fiber optical parametric oscillator cavity near the grating. Such parametric fluorescence in dispersion-shifted fiber was recently used to demonstrate an all-fiber photon-pair source for quantum communications.

The fact that there is sufficient mode overlap within the microstructure fiber between the pump and signal beams in the configuration of FIG. 1 is a consequence of the elliptical polarization-mode behavior of the microstructure fiber. If one were to assume that the polarization eigenmodes of the microstructure fiber 12 are wavelength-independent linear-polarization states, then it would have been very difficult to observe oscillation in the cavity configuration of FIG. 1, because the polarizations of the pump and signal would be orthogonal to each other. In principle, cross-polarized four-wave mixing is possible, but the nonlinear coefficient for such mixing is nine times smaller than that for co-polarized four-wave mixing. In addition, there exists a large group-velocity mismatch (1.7±0.1 ps/m) between the microstructure fiber's polarization modes, which would further reduce the cross-polarized gain by shortening the effective interaction length. Co-polarized four-wave mixing can be verified as the dominate gain mechanism by operating the microstructure fiber optical parametric oscillator with an additional polarizer placed in the cavity near the mirror 16.

For elliptical eigenmodes of the fiber, the orthogonal linear polarizations of the injected pump and the oscillating signal have co-polarized projections onto the eigenmodes of the microstructure fiber. The microstructure fiber optical parametric oscillator oscillates when there is sufficient pump power to provide the needed four-wave mixing gain in a given eigenmode to offset the loss in the Fabry-Perot cavity. According to our measurements, we estimate the round-trip loss in the signal cavity to be 12 dB (round-trip transmissivity of 0.06±0.01), wherein we have taken into account the round-trip microstructure fiber transmissivity of 0.34±0.05 (this includes round-trip coupling loss, Fresnel loss at each interface, and round-trip absorption loss in the fiber), the grating diffraction efficiency of 0.67±0.02, and the polarization-mode overlap of 0.29±0.02 between the signal linear-polarization mode and the eigenmode of the microstructure fiber. The single-pass small-signal gain of the microstructure fiber optical parametric oscillator was modeled using the technique described in J. E. Sharpling, M. Fiorentino, A. Coker, P. Kumar, and R. S. Windeler, Opt. Lett., 26, 1048 (2001). For a pump wavelength of 751.8 nm and a pump peak power equal to the threshold power of 34.4 W, the resulting gain is shown as the dashed curve in FIG. 4. Other parameters used in the model were $A_{eff}$=3.5 $\mu m^2$ and D=1.8 ps/(nm km). The peak calculated small-signal gain of 19 dB is reasonable when compared with the measured 12 dB round-trip loss value. Also the wavelength regions wherein the small-signal gain exceeds the round-trip loss is in very good agreement with the spans over which the signal oscillation is observed (see FIG. 4).

Figure 5:
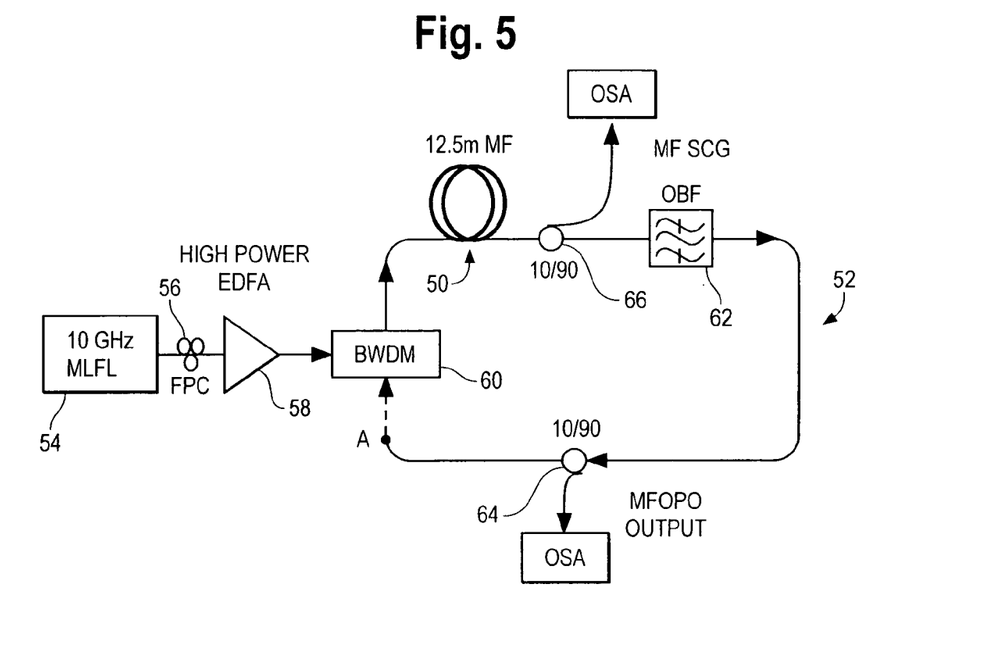
FIG. 5 is a block diagram of another embodiment of the fiber optical parametric oscillator of the present invention in a ring configuration.

In accordance with another embodiment of the present invention, as shown in FIG. 5, the microstructure fiber optic parametric oscillator is formed in a ring or loop configuration. Whereas, the embodiment of FIG. 1 utilizes free space optics where light propagates through air, in the embodiment of FIG. 5, fiber optic components are utilized so that light propagates through fibers throughout the parametric oscillator. The embodiment of FIG. 5 is a 10 GHz repetition-rate synchronously pumped microstructure fiber optical parametric oscillator with the potential for 120 nm tunability around 1550 nm. Thus, the present invention is suitable for telecommunications applications which typically require sources in the spectral region near 1550 nm.

The microstructure fiber optical parametric oscillator of FIG. 5 uses only a 12.5 m long piece of microstructure fiber 50 with a parametric gain coefficient of approximately 200 dB/W/km. A suitable microstructure fiber 50 is fabricated by Crystal-Fiber A/S. The silica core of microstructure fiber has an average diameter of 2.4 (±0.2) $\mu$m and is surrounded by a hexagonal array of approximately 0.8-$\mu$m diameter air voids. The total loss through the MF is 1.7 dB, including connector losses on each end of the fiber. The zero-dispersion wavelength for the fiber 50 is $\lambda_0$=1544 (±3) nm, and the dispersion slope is −0.2 (±0.05) ps/nm²/km. In addition to the 12.5 m microstructure fiber 50, the parametric oscillator of FIG. 5 includes a 14.5 m fiber in the loop 52 that is standard SMF-28.

A mode-locked fiber laser 54 operating at 10 GHz repetition rate with a wavelength of 1537 nm provides 6 ps duration pump pulses. The polarization of the pump pulses can be adjusted by a fiber polarization controller (FPC) 56. A high power erbium-doped fiber amplifier (EDFA) 58 amplifies the pump pulses which are coupled into the ring cavity 52 by a bandpass wavelength division multiplexer (BWDM) 60. The ring cavity 52 includes a tunable optical bandpass filter (OBF) 62 with a 1 nm bandwidth for selecting the desired oscillating wavelength. The ring cavity 52 further includes a 10/90 fused coupler 64 to provide the output of the microstructure fiber optic parametric oscillator. A second 10/90 fused coupler 66 can also be provided between the microstructure fiber 50 and the optical bandpass filter 62.

When the loop formed by the ring cavity 52 is open such that the fiber at point A is disconnected from the bandpass wavelength division multiplexer 60, the high nonlinear coefficient of the microstructure fiber which is on the order of 24 $W^{-1}km^{-1}$, causes the generation of a broad spectrum of supercontinuum at the output of the parametric oscillator. However, when the loop is closed such that the fiber at point A is connected to the bandpass wavelength division multiplexer 60 and the pump repetition rate is adjusted so that it is equal to an integer multiple of the cavity free-spectral range or cavity repetition rate, synchronous microstructure fiber optic parametric oscillation action is established. In an alternative embodiment, an optical delay line can be used in the cavity 52 to adjust the free-spectral range to a subharmonic of a fixed pump repetition rate.

Figure 6:
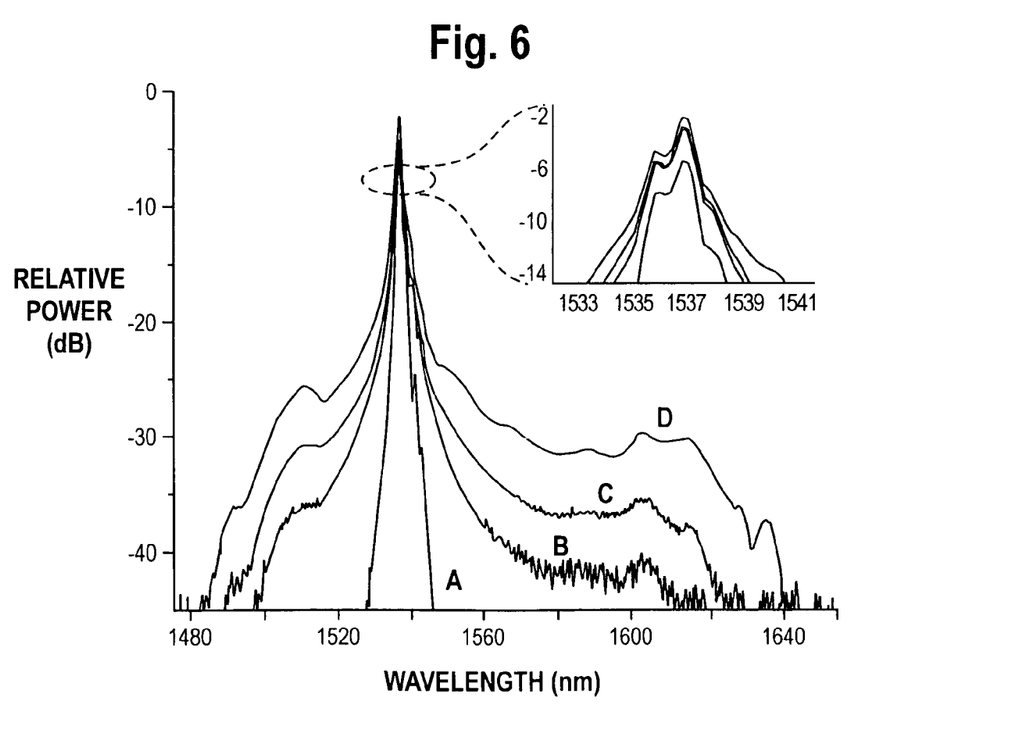
FIG. 6 is a graph illustrating a plot of the open loop supercontinuum spectra for various pump peak powers for the embodiment of FIG. 5.

FIG. 6 illustrates the open-loop supercontinuum spectra for various launch powers into the microstructure fiber 50. Trace D is for 5.9 W pump peak power (354 mW average power) for which the 30 dB down (relative to the pump) bandwidth of the continuum is 120 nm. Here, the polarization of the input pump pulses was adjusted using the fiber polarization controller 56 to maximize the supercontinuum generation spectral width. From trace D as depicted in the inset graph of FIG. 6, it is seen that the strong peak at 1537 nm that is due to the pump wave has been broadened to a spectral width of approximately 1.5 nm due to self-phase modulation. Further, a broad spectral feature at 1610 nm emerges, which is downshifted from the pump frequency by approximately 10 THz, a value corresponding to the maximum of the Raman gain.

Figure 7:
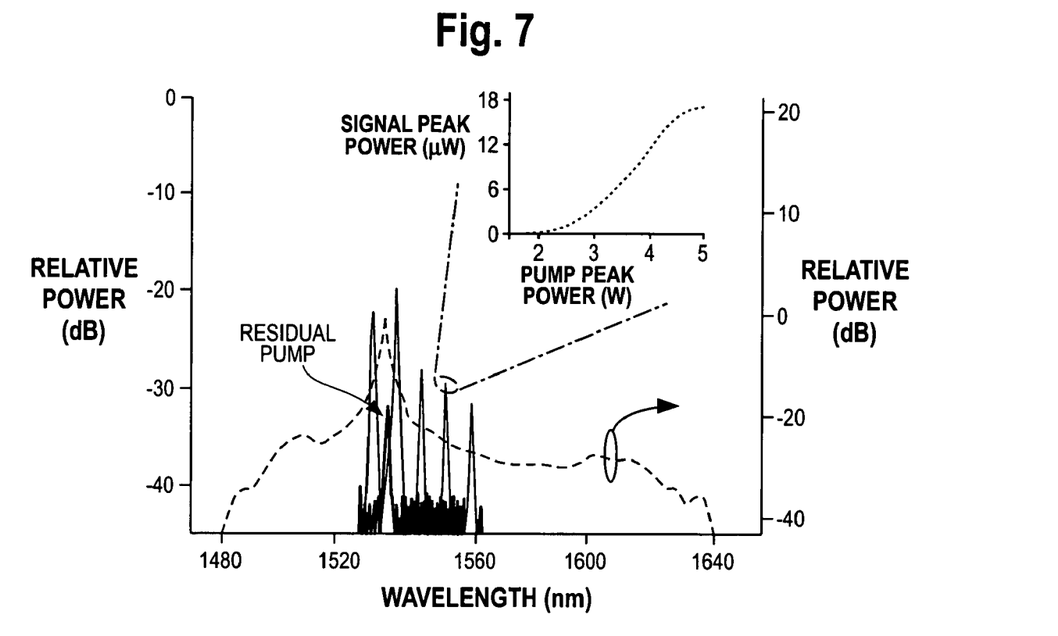
FIG. 7 is a graph illustrating a composite of the closed loop output spectra of the microstructure fiber optical parametric oscillator of the embodiment of FIG. 5 for five different oscillating signal wavelengths.

With the ring cavity loop closed and the cavity length adjusted for oscillations, the spectrum of pulses taken at the output of the microstructure fiber optic parametric oscillator consists of a narrow peak at the passband of the filter 62 along with a much weaker peak corresponding to the residual pump wave. FIG. 7 illustrates a composite of the output spectra for five different settings of the optical bandpass filter 62 wherein the plotting is only for the spectrum in the vicinity of the passband of the filter 62 in each case. The spectrum in the vicinity of the residual pump wave is also plotted for one setting of the filter 62. The pump peak power was 5.9 W and the corresponding supercontinuum spectrum is shown by the dashed trace in FIG. 7. The inset graph of FIG. 7 shows an example of the measured microstructure fiber optical parametric oscillator output peak power as a function of the pump peak power injected into the microstructure fiber 50. An oscillation threshold is seen as the pump peak power crosses 2 W. Although the tunability range depicted was limited to 30 nm due to the characteristics of the optical bandpass filter 62 and the bandpass wavelength division multiplexer 60 utilized in the setup from which the measurements of FIG. 7 were obtained, by using optical bandpass filter and bandpass wavelength division multiplexer components with appropriate characteristics, the tuning range is expected to be at least 120 nm. That is because the growth of the supercontinuum over the 120 nm range implies the presence of optical gain through a combination of the Raman and parametric four-wave mixing processes. In the closed loop configuration, once a portion of the supercontinuum is filtered, the pump wave transfers energy to the signal wave, which experiences gain through the combined action of Raman and parametric four-wave mixing processes. Mode-locked oscillations occur when the signal gain per pass exceeds the 7 dB roundtrip loss in the cavity 52 and the pump repetition rate is equal to a harmonic of the cavity free-spectral range.

Figure 8:
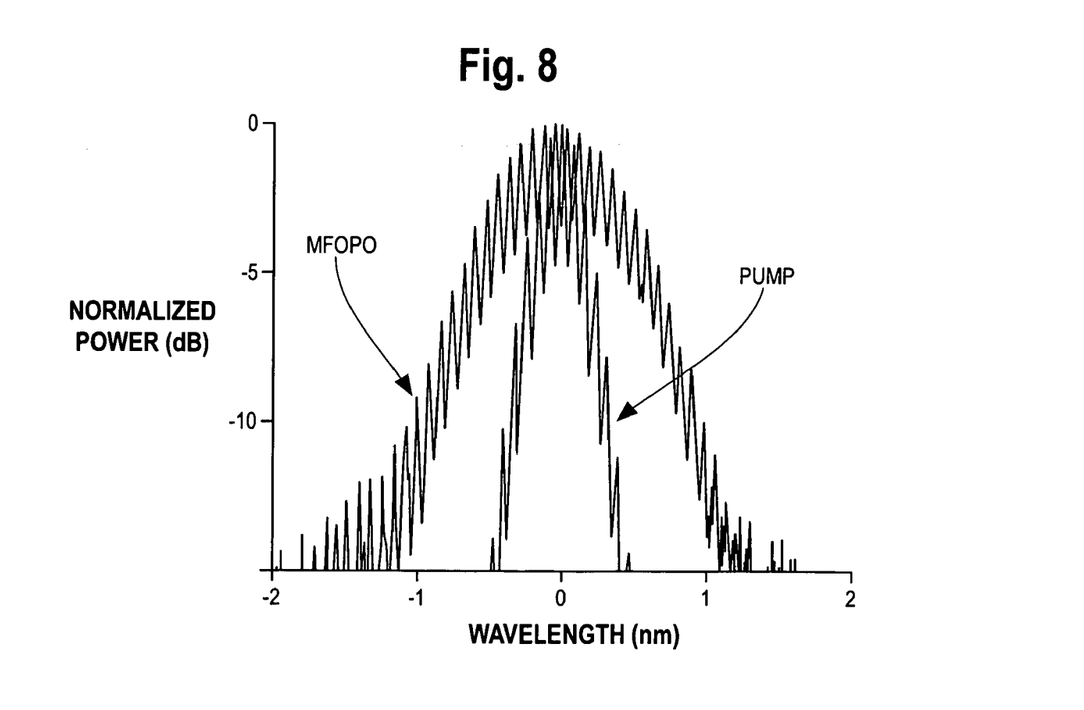
FIG. 8 is a graph illustrating the optical spectra of the 10 GHz rate pump source and the output of the microstructure fiber optical parametric oscillator of FIG. 5 at 1556 nm with 0.01 nm resolution.

FIG. 8 illustrates the high resolution optical spectra of the 10 GHz synchronized oscillating signal pulses at 1556 nm along with the 10 GHz repetition rate pump pulses that are launched into the microstructure fiber 50. The modulation depth of the 0.08 nm spaced peaks in the spectrum of the signal pulses is comparable to that in the pump pulses, which is indicative of the strong mode locking of the microstructure fiber optic parametric oscillator.

The microstructure fiber synchronized optical parametric oscillator of FIG. 5 emits 10 GHz rate picosecond pulses in the 1550 nm telecommunications band. This parametric oscillator is capable of more than 120 nm tunability over the entire gain band of the combined Raman and parametric processes. Such a high repetition rate, widely tunable source is very useful in high capacity wavelength division multiplexing and time division multiplexing transmission systems.

Many modifications and variations of the present invention are possible in light of the above teachings. Thus, it is to be understood that the invention may be practiced otherwise than as described hereinabove.

What is claimed is:

1. A fiber optical parametric oscillator comprising:
   a microstructure fiber having a first end and a second end;
   a pump wave input to the first end of the microstructure fiber;
   a reflective mirror for reflecting a wave from the second end of the microstructure fiber back to the microstructure fiber;
   a diffraction grating tuned to reflect a signal wave of a particular wavelength;
   a beam splitter disposed between the first end of the microstructure fiber and the diffraction grating, the beam splitter passing the pump wave to the first end of the microstructure fiber, the wave being reflected by the reflective mirror back through the microstructure fiber, the microstructure fiber generating a signal wave and an idler wave that are directed from the first end of the microstructure fiber to the diffraction grating by the beam splitter, the diffraction grating reflecting a signal wave of the particular wavelength back to the beam splitter and from the beam splitter back to the microstructure fiber, and the beam splitter passing a portion of the signal wave to an output of the parametric oscillator.

2. A fiber optical parametric oscillator as recited in claim 1 wherein the wavelength of the pump wave is near the zero-dispersion wavelength of the microstructure fiber.

3. A fiber optical parametric oscillator as recited in claim 1 including a half-wave plate disposed between the beam splitter and the first end of the microstructure fiber.

4. A fiber optical parametric oscillator as recited in claim 1 including a quarter-wave plate disposed between the reflective mirror and the second end of the microstructure fiber.

5. A fiber optical parametric oscillator as recited in claim 1 including a quarter-wave plate disposed between the diffraction grating and the beam splitter.

6. A fiber optical parametric oscillator as recited in claim 1 wherein the beam splitter passes a portion of the signal wave through a pin hole aperture.

7. A fiber optical parametric oscillator as recited in claim 1 wherein the microstructure fiber is a holey fiber.

8. A fiber optical parametric oscillator as recited in claim 1 wherein the microstructure fiber is a photonic crystal fiber.

9. A fiber optical parametric oscillator as recited in claim 1 wherein the microstructure fiber has elliptical polarization modes.

10. A fiber optical parametric oscillator as recited in claim 1 wherein the microstructure fiber has polarization modes that are not elliptical.

11. A fiber optical parametric oscillator as recited in claim 1 wherein the beam splitter is a polarization beam splitter.

12. A fiber optical parametric oscillator as recited in claim 1 having phase matched four-wave mixing in the microstructure fiber.

13. A fiber optical parametric oscillator as recited in claim 1 wherein the reflective mirror is movable.

14. A fiber optical parametric oscillator as recited in claim 1 including a high power laser source for providing the pump wave.

15. A fiber optical parametric oscillator as recited in claim 1 wherein the wave passed to the input of the first end of the microstructure fiber is equally horizontally and vertically polarized.

16. A fiber optical parametric oscillator as recited in claim 1 wherein the wave passed to the input of the first end of the microstructure fiber is not equally horizontally and vertically polarized.

17. A fiber optical parametric oscillator as recited in claim 1 wherein the optics include free-space optics.

18. A fiber optical parametric oscillator comprising:
   a microstructure fiber having a first end and a second end;
   a pump wave input to the first end of the microstructure fiber;
   a movable reflective mirror for reflecting a wave from the second end of the microstructure fiber back to the microstructure fiber;
   a diffraction grating tuned to reflect a signal wave of a particular wavelength;
   a beam splitter disposed between the first end of the microstructure fiber and the diffraction grating, the beam splitter passing the pump wave to the first end of the microstructure fiber, the wave being reflected by the reflective mirror back through the microstructure fiber, the microstructure fiber generating a signal wave and an idler wave that are directed from the first end of the microstructure fiber to the diffraction grating by the beam splitter, the diffraction grating reflecting a signal wave of the particular wavelength back to the beam splitter and from the beam splitter back to the microstructure fiber, and the beam splitter passing a portion of the signal wave to an output of the parameter oscillator.

19. A fiber optical parametric oscillator as recited in claim 18 including a half-wave plate disposed between the beam splitter and the first end of the microstructure fiber.

20. A fiber optical parametric oscillator as recited in claim 18 including a quarter-wave plate disposed between the diffraction grating and the beam splitter.

21. A fiber optical parametric oscillator as recited in claim 18 wherein the wavelength of the pump wave is near the zero-dispersion wavelength of the microstructure fiber.

22. A fiber optical parametric oscillator as recited in claim 18 wherein the microstructure fiber has elliptical polarization modes.

23. A fiber optical parametric oscillator as recited in claim 18 wherein the microstructure fiber has polarization modes that are not elliptical.

24. A fiber optical parametric oscillator comprising:
a microstructure fiber having a first end and a second end;
a pump wave input to the first end of the microstructure fiber;
a movable reflective mirror for reflecting a wave from the second end of the microstructure fiber back to the second end of the microstructure fiber;
a diffraction grating tuned to reflect a signal wave of a particular wavelength;
a beam splitter disposed between the pump wave input and the first end of the microstructure fiber and between the diffraction grating and the microstructure fiber; and
a half-wave plate disposed between the beam splitter and the first end of the microstructure fiber.

25. A fiber optical parametric oscillator as recited in claim 24 wherein the wavelength of the pump wave is near the zero-dispersion wavelength of the microstructure fiber.

26. A fiber optical parametric oscillator as recited in claim 24 including a quarter-wave plate disposed between the diffraction grating and the beam splitter.

27. A fiber optical parametric oscillator as recited in claim 24 wherein the microstructure fiber has elliptical polarization modes.

28. A fiber optical parametric oscillator as recited in claim 24 including a high power laser source for providing the pump wave.

29. A fiber optical parametric oscillator comprising:
a microstructure fiber having a first end and a second end, the microstructure fiber having a zero-dispersion wavelength;
a pump wave input to the first end of the microstructure fiber, the pump wave having a wavelength near the zero-dispersion wavelength of the microstructure fiber;
a movable reflective mirror for reflecting a wave from the second end of the microstructure fiber back to the second end of the microstructure fiber;
a diffraction grating tuned to reflect a signal wave of a particular wavelength;
a beam splitter disposed between the pump wave input and the first end of the microstructure fiber and between the diffraction grating and the microstructure fiber; and
a half-wave plate disposed between the beam splitter and the first end of the microstructure fiber.

30. A fiber optical parametric oscillator as recited in claim 29 including a quarter-wave plate disposed between the diffraction grating and the beam splitter.

31. A fiber optical parametric oscillator as recited in claim 29 wherein the microstructure fiber has elliptical polarization modes.

32. A fiber optical parametric oscillator as recited in claim 29 wherein the microstructure fiber has polarization modes that are not elliptical.

33. A fiber optical parametric oscillator as recited in claim 29 having phase matched four-wave mixing in the microstructure fiber.

34. A fiber optical parametric oscillator as recited in claim 29 including a high power laser source for providing the pump wave.

35. A fiber optical parametric oscillator comprising:
a fiber optical ring cavity, at least a portion of which is formed of a microstructure fiber, the cavity having an associated repetition rate;
a pump wave coupled to an input of the cavity, the pump wave having a repetition rate that is a multiple of the cavity repetition rate; and
a tunable optical bandpass filter in the ring cavity.

36. A fiber optical parametric oscillator as recited in claim 35 wherein the oscillator is synchronously mode-locked at a cavity fundamental frequency that is the same as the fundamental rate of the pump wave.

37. A fiber optical parametric oscillator as recited in claim 35 wherein the oscillator is synchronously mode-locked at a cavity fundamental frequency that is at a subharmonic of the pump wave.

38. A fiber optical parametric oscillator as recited in claim 35 herein the oscillator is synchronously mode-locked at a cavity fundamental frequency that is at a high harmonic of the pump wave.

39. A fiber optical parametric oscillator as recited in claim 35 wherein the microstructure fiber has a positive dispersion slope.

40. A fiber optical parametric oscillator as recited in claim 35 wherein the microstructure fiber has a negative dispersion slope.

41. A fiber optical parametric oscillator as recited in claim 35 wherein the pump wave is coupled to an input of the cavity by a bandpass wavelength division multiplexer.

42. A fiber optical parametric oscillator as recited in claim 35 including a fused coupler in the ring cavity to provide an output of the fiber optical parametric oscillator.

43. A fiber optical parametric oscillator as recited in claim 35 including a mode locked fiber laser providing the pump wave.

44. A fiber optical parametric oscillator as recited in claim 35 including a fiber laser with a tunable repetition rate for providing the pump wave.

45. A fiber optical parametric oscillator as recited in claim 35 having four-wave mixing in the microstructure fiber.

46. A fiber optical parametric oscillator as recited in claim 35 wherein the microstructure fiber has elliptical polarization modes.

47. A fiber optical parametric oscillator as recited in claim 35 wherein the microstructure fiber has polarization modes that are not elliptical.

48. A fiber optical parametric oscillator comprising:
a fiber optical ring cavity, at least a portion of which is formed of a microstructure fiber;
a pump wave coupled to an input of the cavity, to provide synchronously pumped parametric oscillation in the cavity; and
wherein the fiber optical parametric oscillator is tunable over a range in a 1550 nm band.

49. A fiber optical parametric oscillator as recited in claim 48 wherein the oscillator is synchronously mode-locked at a cavity fundamental frequency that is the same as the fundamental rate of the pump wave.

50. A fiber optical parametric oscillator as recited in claim 48 wherein the oscillator is synchronously mode-locked at a cavity fundamental frequency that is at a subharmonic of the pump wave.

51. A fiber optical parametric oscillator as recited in claim 48 wherein the oscillator is synchronously mode-locked at a cavity fundamental frequency that is at a high harmonic of the pump wave.

52. A fiber optical parametric oscillator as recited in claim 48 including a tunable optical bandpass filter in the ring cavity.

53. A fiber optical parametric oscillator as recited in claim 48 wherein the parametric oscillator is tunable over a range of at least 100 nm.

54. A fiber optical parametric oscillator as recited in claim 48 wherein the parametric oscillator is tunable over a range of at least 120 nm.

55. A fiber optical parametric oscillator as recited in claim 48 wherein the pump wave is coupled to an input of the cavity by a bandpass wavelength division multiplexer.

56. A fiber optical parametric oscillator as recited in claim 48 including a fused coupler in the ring cavity to provide an output of the fiber optical parametric oscillator.

57. A fiber optical parametric oscillator as recited in claim 48 including a mode locked fiber laser providing the pump wave.

58. A fiber optical parametric oscillator as recited in claim 48 including a fiber laser with a tunable repetition rate for providing the pump wave.

59. A fiber optical parametric oscillator as recited in claim 48 having four-wave mixing in the microstructure fiber.

60. A fiber optical parametric oscillator as recited in claim 48 wherein the microstructure fiber has a positive dispersion slope.

61. A fiber optical parametric oscillator as recited in claim 48 wherein the microstructure fiber has a negative dispersion slope.

62. A fiber optical parametric oscillator as recited in claim 48 wherein the microstructure fiber has elliptical polarization modes.

63. A fiber optical parametric oscillator as recited in claim 48 wherein the microstructure fiber has polarization modes that are not elliptical.

* * * * *